P. DELESCAILLE.
Improvement in Velocipedes.

No. 133,211. Patented Nov. 19, 1872.

Witnesses:
Lewis B. Wynne, Jr.
Harry Coleman

Inventor:
Peter Delescaille,
By Johnson Klaucke & Co.
his Attorneys.

UNITED STATES PATENT OFFICE.

PETER DELESCAILLE, OF MONTEZUMA, IOWA.

IMPROVEMENT IN VELOCIPEDES.

Specification forming part of Letters Patent No. 133,211, dated November 19, 1872.

*To all whom it may concern:*

Be it known that I, PETER DELESCAILLE, of Montezuma, in the county of Poweshiek and State of Iowa, have invented a new and useful Improvement in Velocipedes or Invalid-Conveyances, of which the following is a specification:

My invention relates more particularly to that class of velocipedes adapted for the locomotion of persons deprived of the use of their legs; and the object of my improvement is to provide a means whereby such persons can guide the vehicle by the movement or action of the shoulders; and the invention which forms the subject-matter of this patent consists in the arrangement and combination, in a three-wheeled vehicle, of a connecting-rod with a front caster or guide wheel and a swiveling-rod operated by the shoulders of the occupant without depending in any manner whatever upon feet or limb supports; the said connecting-rod being attached by a crank to the lower end of the vertical swiveling back-rod, and by an arm to the swiveling-stem of the guide-wheel, so that the movement of the rear crank is instantly communicated to the front wheel, and the invalid, having his hands free, propels the rear wheels and guides the front one in the manner stated.

Figure 1:
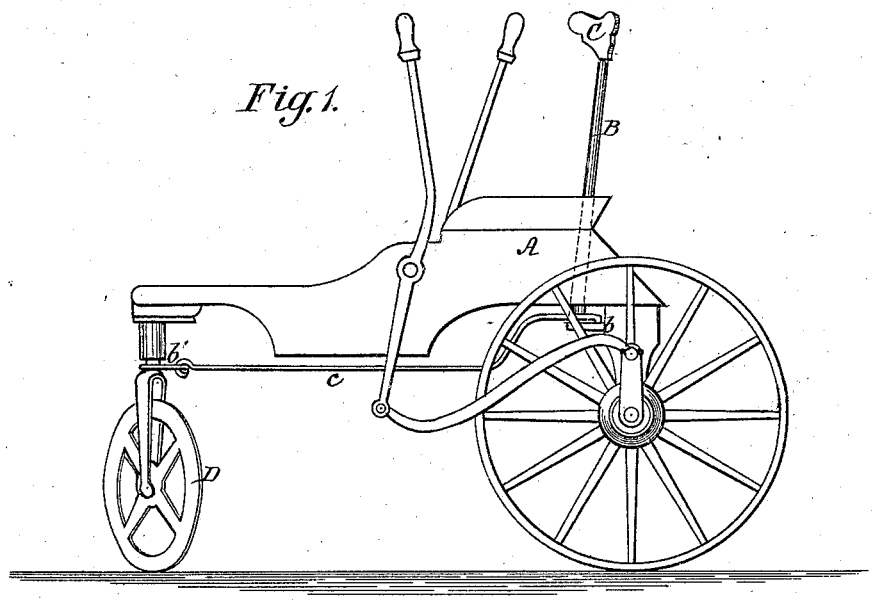
Figure 2:
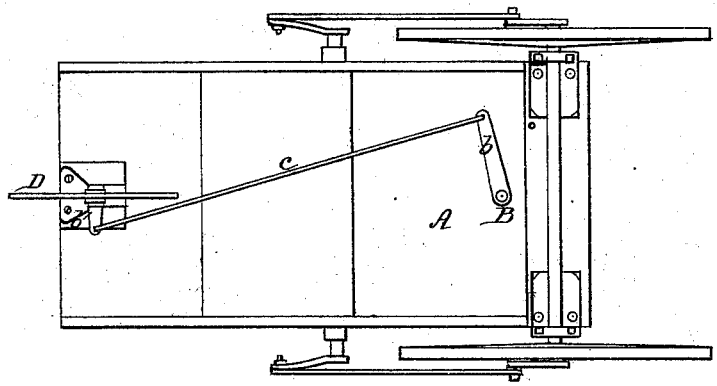

In the accompanying drawing, Figure 1 represents a side elevation of my improved velocipede, showing the upright rod and back plate in perspective, and the caster-wheel as turned to the right. Fig. 2 represents a bottom view of the same, showing the operating parts.

In the example shown, my improvement is applied to an invalid's wagon having three wheels, and constructed upon the ordinary plan. Passing down through the seat A in the rear of the person is a swiveling rod or upright, B, provided with a back-plate, C, which may be made adjustable to suit the height of the person. This back-plate C is made to conform to the back and shoulders of a man. The swiveling-rod B ends under the vehicle bed or box in a crank-lever, $b$, which communicates, by means of a connecting-rod, $c$, with a similar crank, $b'$, operating the caster or guide-wheel D, which caster-wheel swivels in a socket embedded in the wagon-box.

From the foregoing description, taken in connection with the drawing, the operation of my invention is obvious: When the operator presses the back-plate with his right shoulder the vehicle is turned to the left, and vice versa, the cranks $b$ $b'$ being arranged and connected to produce this result. It will be seen that, by reason of the eccentric cranks and compound levers of the propelling device, if the operator have no legs and only one arm he may easily propel and guide the vehicle. This device may be applied to any of the three-wheeled invalid-wagons now in use. The crank $b$ extends laterally from the vertical rod B directly beneath the seat, and the arm $b'$ of the guide-wheel D also extends laterally from its stem, but in an opposite direction to the crank $b$, as shown in Fig. 2, whereby the least swiveling motion of the rod B is communicated to the front guide-wheel by the connecting-rod beneath the vehicle.

Having described my invention, I claim—

In a three-wheeled vehicle or invalid-wagon, the arrangement and combination of the connecting-rod $c$ with the crank $b$ of the swiveling-rod B and the arm $b'$ of the front guide-wheel D, as and for the purpose set forth.

In testimony whereof I have hereunto set my hand this 30th day of July, A. D. 1872.

PETER DELESCAILLE.

Witnesses:
HENRY MARTIN,
JULES DELESCAILLE.